US007324495B1

(12) United States Patent
Gibbons et al.

(10) Patent No.: US 7,324,495 B1
(45) Date of Patent: Jan. 29, 2008

(54) SYSTEM AND METHOD FOR BROADCASTING TIMING INFORMATION TO REMOTE UNITS IN A WIRELESS MULTIPLE ACCESS NETWORK

(75) Inventors: David B. Gibbons, Redmond, WA (US); Liang A. Hong, Redmond, WA (US); Elliott Hoole, Redmond, WA (US)

(73) Assignee: Clearwire Corporation, Kirkland, WA (US)

( * ) Notice: Subject to any disclaimer, the term of this patent is extended or adjusted under 35 U.S.C. 154(b) by 1223 days.

(21) Appl. No.: 09/592,820

(22) Filed: Jun. 12, 2000

Related U.S. Application Data (60) Provisional application No. 60/140,901, filed on Jun. 23, 1999.

(51) Int. Cl.
*H04J 1/00* (2006.01)
(52) U.S. Cl. .................. 370/343; 370/203; 370/208; 370/344
(58) Field of Classification Search ............... 370/203, 370/208, 210, 328, 329, 330, 336, 337, 343, 370/344, 345, 347, 350, 503, 509, 510, 512, 370/513
See application file for complete search history.

(56) References Cited

U.S. PATENT DOCUMENTS

| | | | |
|---|---|---|---|
| 5,177,740 A | 1/1993 | Toy et al. ............. 370/100.1 |
| 5,517,505 A | 5/1996 | Buchholz et al. ......... 307/105.1 |
| 5,699,388 A | 12/1997 | Wang et al. ............... 375/356 |
| 5,854,454 A * | 12/1998 | Upender et al. ............ 187/247 |
| 5,867,478 A * | 2/1999 | Baum et al. ............... 370/203 |
| 5,909,436 A * | 6/1999 | Engstrom et al. ........... 370/343 |
| 5,945,949 A | 8/1999 | Yun ........................ 342/457 |
| 6,041,047 A | 3/2000 | Diachina et al. ........... 370/347 |
| 6,084,871 A * | 7/2000 | Engstrom et al. ........... 370/350 |
| 6,150,980 A * | 11/2000 | Krasner ................. 342/357.1 |
| 6,278,699 B1 * | 8/2001 | Atarius ..................... 370/324 |
| 6,430,148 B1 * | 8/2002 | Ring ........................ 370/208 |
| 6,470,030 B1 * | 10/2002 | Park et al. ................. 370/480 |
| 2001/0055297 A1 * | 12/2001 | Benveniste ................ 370/349 |

* cited by examiner

*Primary Examiner*—Wing Chan
*Assistant Examiner*—Mark A. Mais
(74) *Attorney, Agent, or Firm*—Davis Wright Tremaine LLP; Michael J. Donohue (57) ABSTRACT

A method has been provided for using the broadcast channel of a wireless multiple access network to communicate network timing information, or a time-stamp, to remote units. The method defines a broadcast channel protocol which divides communication frames into units called broadcast channel (BC) superframes. Each broadcast channel superframe is given a unique identification number, called a superframe count, which is transmitted by each base station. Then, both the network base stations and remote units can record events using the known superframe count. A method is also disclosed for the network to assign 14-bit identification numbers to remote units being installed into the network, so that communications can be conducted with installed remote units using the identification numbers instead of the 32-bit hardware serial numbers.

19 Claims, 5 Drawing Sheets

SYSTEM AND METHOD FOR BROADCASTING TIMING INFORMATION TO REMOTE UNITS IN A WIRELESS MULTIPLE ACCESS NETWORK

RELATED APPLICATION

This application claims the benefit of U.S. Provisional Application No. 60/140,901, filed Jun. 23, 1999 and entitled "Method for Broadcasting Information to Multiple Client Units in a Personal Wireless Access Network" which is incorporated herein in its entirety.

BACKGROUND OF THE INVENTION

This invention relates generally to communication systems and, more particularly, to a technique of broadcasting network timing 5 information and identification numbers to remote units (RUs) in a wireless communication network.

Some communications are synchronously timed, so that base stations and remote units are both operating in response to precision clocks. Then, overhead can be saved by organizing communication so that units use pre-assigned time slots. However, synchronized communications require that the remote units to be equipped with precision clocks, to be supplied with frequent timing corrections, or both. To this end, global positioning satellite (GPS) receivers are often used to access precision satellite timing. GPS receivers cannot be conveniently used in all situations. However, when they, or some other precision timing element, are attached to the remote units, events can be recorded with respect to a network clock, or time-stamped. That is, both the base stations and remote units are able to reference events against a common defined measure of absolute time. This time-stamp information makes billing and maintenance events easier to accomplish.

Multiple access wireless communication networks, including first, second, and third generation cellular telephones, are typically organized around a centralized set of protocols which are maintained and initialized from a central site such as a mobile switching center (MSC). The MSC organizes the flow of communications between base stations (BSs) and remote units (RUs). These multiple access networks are typically asynchronous, meaning the communications are organized in a framing structure that depends on the remote units adopting the timing of the base station and responding to base station commands which are embedded in control channels. Many multiple access networks, such as GSM, TDMA (time division multiple access), and the AT&T fixed wireless OFDM (orthogonal frequency division multiplexed) systems break communication frames into time slots, where various units in the network are assigned time slots for the receipt and transmission of information. There are many prior art systems for coarse and fine acquisition of the network time slots, framing structure, and frequencies so that the timing of remote units can be synchronized to the base station, and ultimately the MSC. However, even when synchronized these remote units still have no absolute time information, and events cannot be accurately time-stamped from the point of view of the remote units, unless traffic channel resources are allocated for communications which mark special events or the remote units are equipped with precision clocks.

It would be advantageous if events could be time-stamped at remote units in a multiple access communications network without establishing a synchronous framing protocol, without equipping the remote units with precision clocks, or without the overhead of requesting and receiving timing markers from the MSC.

SUMMARY OF THE INVENTION

Accordingly, a method is provided for establishing a network time, or time-stamp, in a multiple access network. The method comprises: in an orthogonal frequency division multiplexed (OFDM) waveform of cooperating frequency domain channels and in a frame of time domain slots, providing a combination of frequency domain channels and time domain slots which define a broadcast channel; transmitting network clock information on the broadcast channel, from the first base station to remote units; receiving the broadcast channel at a remote unit; and, deriving the network clock information from the received broadcast channel.

Specifically, a broadcast channel is shared between the base stations. As in prior art systems, a portion of the broadcast channel is used to downlink network information to the remote units and to notify remote units of incoming calls. However, portions of the broadcast channel are also used to broadcast a network time information, or a time-stamp. The framing structure in which the communications are embedded includes a consecutive series of broadcast channel (BC) superframes. Each broadcast channel superframe is numbered or given a unique identity called the superframe count. The base stations broadcast the superframe count of the current broadcast channel superframe. Knowing the superframe count, remote units can time-stamp events with the granularity of a broadcast channel superframe.

A method for initializing newly installed remote units is also provided. The method comprises: loading the remote unit with a 32-bit hardware serial number (HSN); installing the remote unit in the network; transmitting the hardware serial number and a corresponding 14-bit remote unit identity (ID) in a broadcast channel; at the remote unit, deriving the remote unit identity in response to receiving the hardware serial number; and, using the remote unit identity for communications with the remote unit. Overhead is reduced with the use of the shorter remote unit identity.

DETAILED DESCRIPTION OF THE PREFERRED EMBODIMENT

The network timing and initialization processes presented in the invention has been tailored for use with the OFDM communication system described in provisional application No. 60/140,901, filed Jun. 23, 1999 and entitled "Method for Broadcasting Information to Multiple Client Units in a Personal Wireless Access Network". This provisional application, which is incorporated herein in its entirety, should be consulted for details of the OFDM system. Highlights of the OFDM system will be represented below to help illustrate the present invention. However, it should be understood that these concepts are applicable to other multiple access networks.

Figure 1:
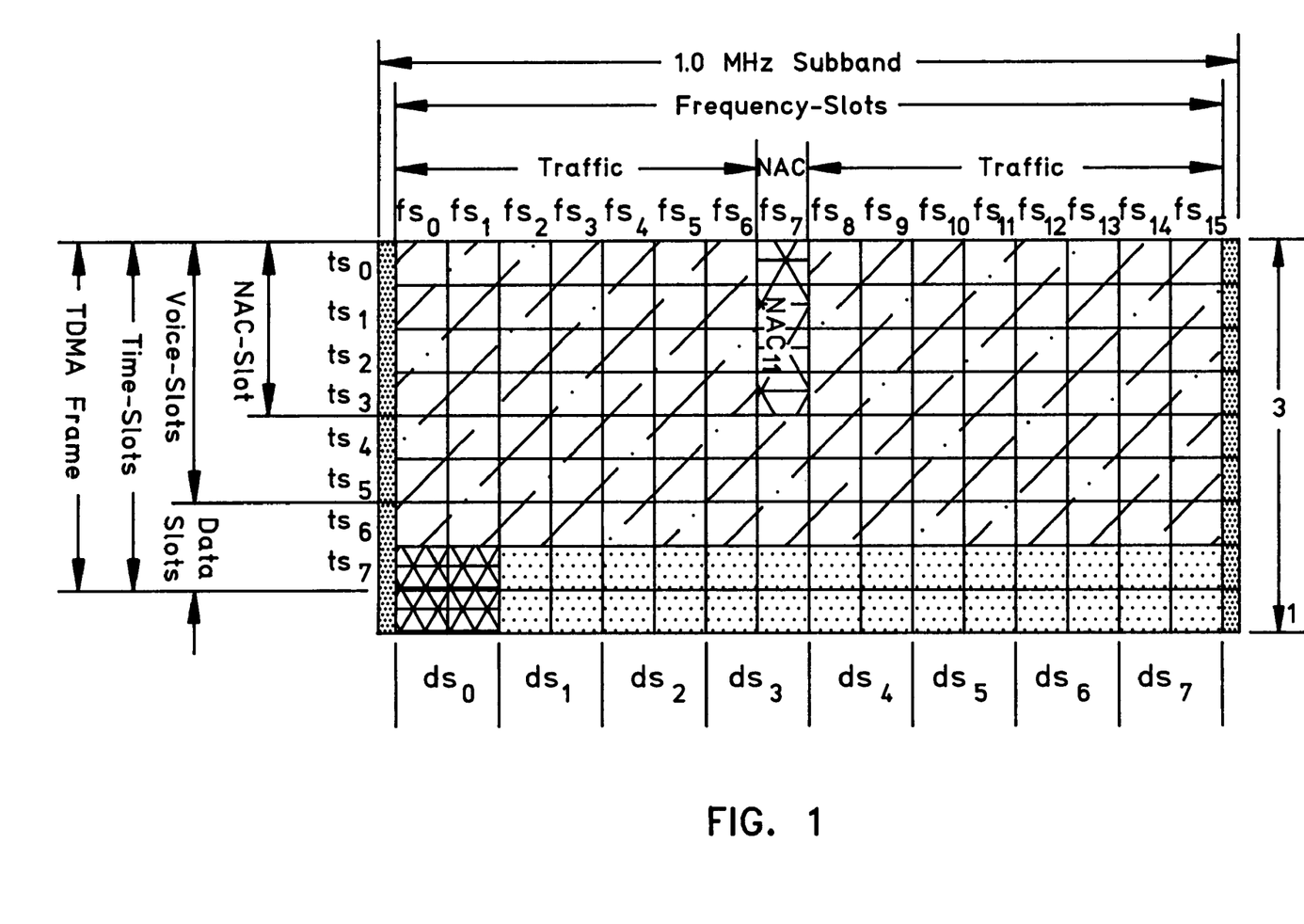
FIG. 1 illustrates an OFDM framing protocol time slot.

FIG. 1 illustrates an OFDM framing protocol time slot. The basic unit of time in the OFDM system is the TDMA (time division multiple access) slot, which is 375 μs in duration. There are 288 information-bearing OFDM tones in a TDMA slot. These 288 tones are divided into 16 frequency slots (groups) of 18 tones each. When the 18 tones in the frequency slot are used for carrying digital data, 16 of the tones carry actual data using 16-QAM modulation. The other two tones are used as pilot tones for equalization purposes. A single tone modulated using 16-QAM modulation carries four bits of information. The sixteen information bearing tones in a frequency slot, therefore, carry a total of 64 bits of information.

Figure 2:
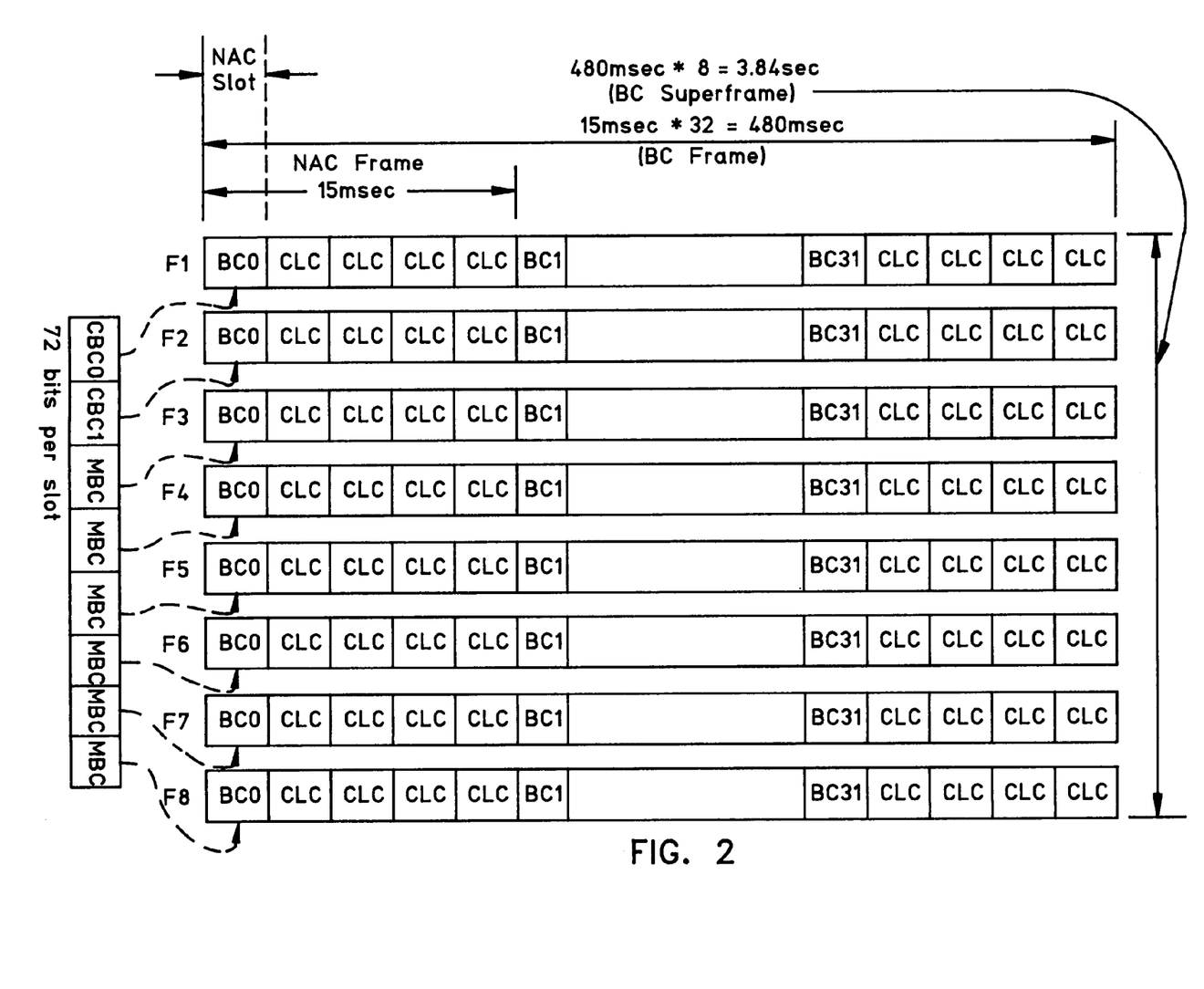
FIG. 2 illustrates the OFDM general framing structure.

FIG. 2 illustrates the OFDM general framing structure. The TDMA slots are organized into a framing structure as follows. Eight TDMA slots constitute a TDMA frame of 3 ms in duration. The first four TDMA slots in a TDMA frame are called a NAC (network access channel) slot. Five network access channel slots constitute a network access channel frame of 15 ms in duration, also known as a broadcast channel slot. Thirty-two broadcast channel slots make up a broadcast channel frame of 480 ms in duration. Eight broadcast channel frames constitute a Broadcast channel superframe.

Figure 3:
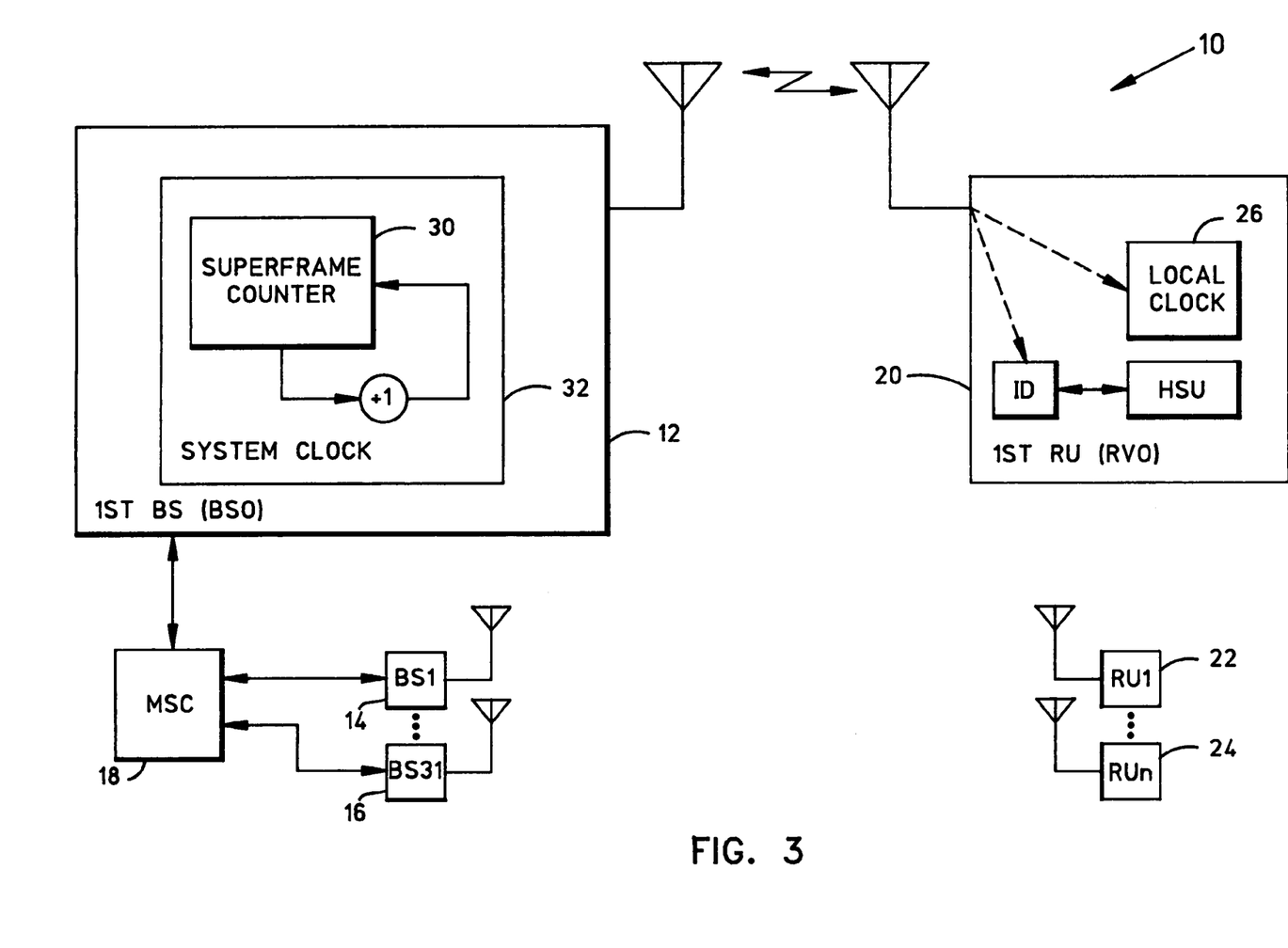
FIG. 3 illustrates elements of a multiple access communications network, such as an OFDM network.

FIG. 3 illustrates elements of a multiple access communications network, such as an OFDM network. Network 10 includes at least a first base station (BS0) 12, although the network typically includes a plurality of base stations which can potentially communicate to remote units. A grouping of thirty-two base stations is represented with the additional depiction of base stations BS1 (14) and BS31 (16). The base stations 12-16 are connected with an MSC 18, or like central function. A detailed explanation of the first base station 12 will be offered which also applies to base stations 14 and 16. The network 10 also includes remote units, such as first remote unit (RU0) 20, RU1 22, and RUn 24. A detailed explanation of first remote unit 20 will be offered that also applies to remote units 22 and 24. One of the base stations, BS0 (14) for example, is in communication with RU0 (20).

The first remote unit 20 is depicted with a local clock 26. The local clock 26 is updated periodically with network timing information transmitted from the base station 12, for example, on a broadcast channel. Returning to FIG. 2, a first broadcast channel frame (F1) is depicted. The first broadcast channel frame includes 32 network access channel frames; the first and 32$^{nd}$ network access channel frames are explicitly shown. The first base station (BS0) 12 transmits in the first network access channel frame, and the 32$^{nd}$ base station (BS31) transmits in the 32$^{nd}$ network access channel frame.

The network access channel frames include five network access channel slots. The first network access channel slot is the broadcast channel (BC), while the other four network access channel slots are a common link control channel (CLC) which performs more conventional control channel functions. The broadcast channel is used to transmit network timing information in a first plurality of the broadcast channel frames. As shown, the first two broadcast channel frames (slots 0 and 1) are used to communicate network timing information. These broadcast channels are designated as CBC (control broadcast channel). The other six broadcast channels (slots 2-7) are designated as MBC (message broadcast channel). These network access channel slots include information addressed to specific remote units, which will be discussed in more detail below. It is understood that the number and placement of the CBC, or other channels, can be varied without changing the function of the present invention.

Tables 1 and 2 illustrate the type of information which is included in a CBC network timing information broadcast channel. CBC slot 0 includes information which identifies the base station (see Table 1). CBC 1 includes the actual network timing information, which is called the superframe count.

TABLE 1

| Element | Size (bits) | Value | Description |
|---|---|---|---|
| More Bit | 1 | 1 | more CBC slots to follow, 1 = more, 0 = no more |
| Base Station Offset Code (BSOC) | 5 | | |
| Base Station identity | 32 | | |
| Base Operational State | 1 | | |
| Base Administrative State | 2 | | |
| Number of MBC Messages | 6 | | |
| Max Base Tx Power | 5 | | |
| Reserved | 12 | | |

TABLE 2

| Element | Size (bits) | Value | Description |
|---|---|---|---|
| More Bit | 1 | 1 | more CBC slots to follow, 1 = more, 0 = no more |
| superframe Count | 29 | | bits 11-39 of packet count |
| Reserved | 34 | | |

Returning briefly to FIG. 1, one TDMA frame of 375 microseconds is called a packet. There are 10,240 packets occurring in a 3.84 second Broadcast channel superframe. The base stations or MSC have 40-bit clocks which can identify segments of time with the granularity of a packet. That is, each packet can be identified by a 40-bit number. However, this degree of precision is typically not required for the purposes of an remote unit time-stamp. It has been determined that a time-stamp with the granularity of a Broadcast channel superframe is sufficient to label special events at the remote units. Therefore, the 11 least significant bits (b0 through b10) of the 40-bit are not transmitted. Alternately stated, every Broadcast channel superframe can be identified by a 29-bit number called the superframe count. Bit b11 is incremented every Broadcast channel superframe, and that 29-bit superframe count is transmitted in CBC slot 1 (see Table 2). Tables 3 and 4 are examples of the superframe count incrementing process.

TABLE 3

| Packet Count | Packet Count (hex) | b15 | b14 | b13 | b12 | b11 | b10 | b9 | b8 | b7 | b6 | b5 | b4 | b3 | b2 | b1 | b0 |
|---|---|---|---|---|---|---|---|---|---|---|---|---|---|---|---|---|---|
| 10240 | 0x2800 | 0 | 0 | 1 | 0 | 1 | 0 | 0 | 0 | 0 | 0 | 0 | 0 | 0 | 0 | 0 | 0 |
| 20480 | 0x5000 | 0 | 1 | 0 | 1 | 0 | 0 | 0 | 0 | 0 | 0 | 0 | 0 | 0 | 0 | 0 | 0 |

TABLE 3-continued

| Packet Count | Packet Count (hex) | b15 | b14 | b13 | b12 | b11 | b10 | b9 | b8 | b7 | b6 | b5 | b4 | b3 | b2 | b1 | b0 |
|---|---|---|---|---|---|---|---|---|---|---|---|---|---|---|---|---|---|
| 30720 | 0x7800 | 0 | 1 | 1 | 1 | 1 | 0 | 0 | 0 | 0 | 0 | 0 | 0 | 0 | 0 | 0 | 0 |
| 40960 | 0xA000 | 1 | 0 | 1 | 0 | 0 | 0 | 0 | 0 | 0 | 0 | 0 | 0 | 0 | 0 | 0 | 0 |

TABLE 4

| Packet Count | Packet Count (hex) | b15 | b14 | b13 | b12 | b11 | b10 | b9 | b8 | b7 | b6 | b5 | b4 | b3 | b2 | b1 | b0 |
|---|---|---|---|---|---|---|---|---|---|---|---|---|---|---|---|---|---|
| 10239 | 0x27FF | 0 | 0 | 1 | 0 | 0 | 1 | 1 | 1 | 1 | 1 | 1 | 1 | 1 | 1 | 1 | 1 |
| 20479 | 0x4FFF | 0 | 1 | 0 | 0 | 1 | 1 | 1 | 1 | 1 | 1 | 1 | 1 | 1 | 1 | 1 | 1 |
| 30719 | 0x77FF | 0 | 1 | 1 | 1 | 0 | 1 | 1 | 1 | 1 | 1 | 1 | 1 | 1 | 1 | 1 | 1 |
| 40959 | 0x9FFF | 1 | 0 | 0 | 1 | 1 | 1 | 1 | 1 | 1 | 1 | 1 | 1 | 1 | 1 | 1 | 1 |

Returning to FIG. 3, the first base station 12 includes a superframe counter 30, which is part of the network clock 32. In alternate aspects of the invention, the network clock 32 and superframe counter 30 are maintained at the MSC 18. Returning briefly to Table 2, it should be noted that 34 bits in CBC slot 1 have been reserved, so that the entire 40-bit superframe count could be transmitted for special circumstances in some aspects of the invention.

Returning again to FIG. 2, the broadcast channel network access channel slots of the last six broadcast channel frames (F3-F8) are MBC. The contents of a MBC message are shown in Table 5. Each MBC message includes an remote unit hardware serial number (hardware serial number) and an remote unit identification number (identity). Thus, each MBC message is addressed to a specific remote unit. Note that the hardware serial number is 32 bits, while the identity is only 14 bits long.

TABLE 5

| Element | Size (bits) | Value | Description |
|---|---|---|---|
| Msg Type | 3 | 1 | |
| remote unit hardware serial number | 32 | | |
| remote unit identity | 14 | | |
| Reserved | 15 | | |

Returning to FIG. 3, the first remote unit 20 includes a memory of some type containing the first remote unit 20 hardware serial number. The hardware serial number is loaded into the remote unit at the factory or upon installation at a site and uniquely identifies an remote unit. This number could be used for network communications with the remote unit. However, system overhead can be conserved by using a shorter (fewer number of bits) identification. When a new remote unit is installed in the network, a decision is made at the MSC to assign a unique 14-bit identification number to the remote unit, and the base stations are notified by the MSC of the decision. The base stations transmit the MBC message with the hardware serial number and corresponding identity. After installation, upon power-up, the first remote unit 20 receives the first base station 12 transmission of the MBC message with the first hardware serial number (belonging to the first remote unit 20) and the corresponding identity. Upon receipt of the MBC message, the first remote unit 20 derives the first identity, registers receipt of the identity with a base station, and the first identity is used in subsequent communications between the base stations and the first remote unit 20. In some aspects of the invention, remote unit identities could be changed, and a new remote unit identity assigned, in a similar fashion after installation.

In some aspects of the system, the local clock 26 of each remote unit is assumed to have limited reliability, or the local clock 26 is deliberately designed to expire within a predetermined number of broadcast channel superframes. Thus, the first remote unit 20 is constantly updating the local clock 26 with a superframe count received in transmission from a base station.

Figure 4:
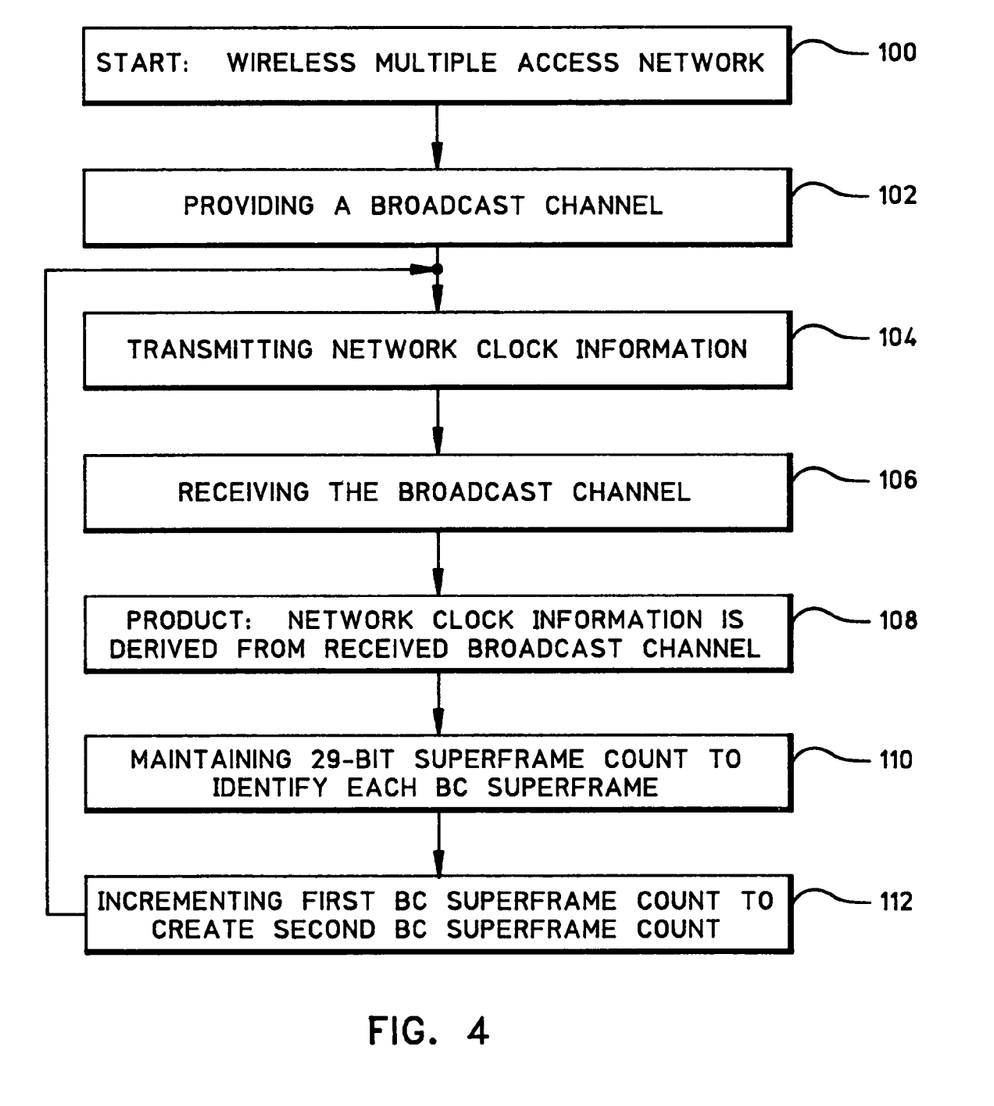
FIG. 4 is a flowchart illustrating a method for establishing a network time or time-stamp.

FIG. 4 is a flowchart illustrating a method for establishing a network time or time-stamp in a wireless multiple access network. Although the method has been labeled as a series of consecutive steps for the purpose of clarity, no order should be inferred from the numbering unless explicitly stated. The process starts in step 100. Step 102, in an orthogonal frequency division multiplexed (OFDM) waveform of cooperating frequency domain channels and a frame of time domain slots, provides a combination of frequency domain channels and time domain slots which define a broadcast channel. Step 104 transmits network clock information on the broadcast channel, from a base station to remote units (RUs). Step 106 receives the broadcast channel at a remote unit. Step 108 is a product where network clock information is derived from the received broadcast channel.

In some aspects of the invention, the providing of a broadcast channel in step 102 includes providing a plurality of identified broadcast channel (BC) superframes. The transmission of the network clock information in step 104 includes identifying a first broadcast channel superframe, and the deriving of the network clock information in step 108 includes the remote unit identifying the first broadcast channel superframe. More specifically, the providing of the broadcast channel in step 102 includes each broadcast channel superframe having eight broadcast channel frames, and the transmission of the first broadcast channel superframe identity in step 104 includes transmitting the first broadcast channel superframe identity in a first plurality of broadcast channel frames. As shown in FIG. 2, the broadcast channel superframe identity is transmitted in the second broadcast channel frame.

In some aspects of the invention, the providing of a broadcast channel in Step 102 includes each broadcast channel frame having 32 network access channel (NAC) frames, and the transmission of the first broadcast channel superframe identity in Step 104 includes transmitting the first broadcast channel superframe identity in a first network access channel frame, in the first plurality of broadcast channel frames. As shown in FIG. 2, the first network access channel frame is literally the first network access channel frame in the second broadcast channel frame. More specifically, the providing of a broadcast channel in step 102 includes each network access channel frame having five network access channel slots, with each network access channel slot including four time (TDMA) slots. Then, in step 104, the first broadcast channel superframe identity is transmitted in a first network access channel slot, in the first network access channel frame.

The providing of a broadcast channel in step 102 includes a second broadcast channel superframe following the first broadcast channel superframe. In some aspects of the invention, a 29-bit superframe count is maintained to identity each broadcast channel superframe in step 110, and the first broadcast channel superframe identity is transmitted in step 104 with a first 29-bit superframe count. Following the first broadcast channel superframe, step 112 increments the first broadcast channel superframe count by one to create a second broadcast channel superframe count. Then, step 104 transmits the second Broadcast channel superframe count, by the base station, to identity the second broadcast channel superframe.

In some aspects of the invention, the providing of a broadcast channel in step 102 includes using 32 reusable base station numbers, with the assignment of one network access channel frame, in each broadcast channel frame, to each base station number.

Figure 5:
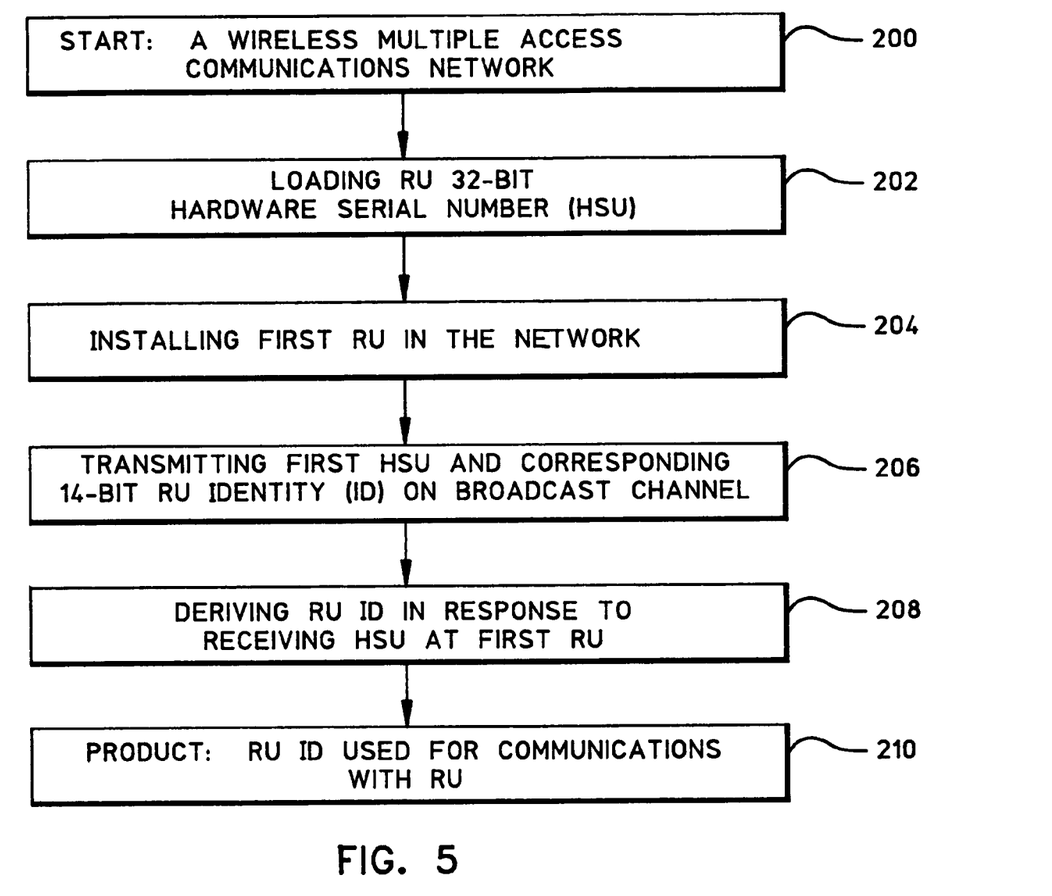
FIG. 5 is a flowchart illustrating a method for initializing a first remote unit.

FIG. 5 is a flowchart illustrating a method for initializing a first remote unit in a wireless multiple access communications network. Step 200 is the start. Step 202 loads the remote unit with a first 32-bit hardware serial number (HSN). Step 204 installs the remote unit in the network. Step 206 transmits the hardware serial number and a corresponding 14-bit remote unit identity (ID) on a broadcast channel. Step 208 derives the remote unit identity in response to receiving the hardware serial number at the remote unit. Step 210 is a product where the remote unit identity is used for communications with the remote unit.

A system and method for providing a network clock and identification number to a remote unit in a multiple access communications network have been described in the context of a specific OFDM fixed wireless application. However, the invention is applicable to a broader field of communications. Other variations and embodiments of the invention will undoubtedly occur the others working in the field of the art upon reflection of the disclosed invention.

What is claimed is:

1. In a wireless multiple access network, a method for establishing a network time comprising:
    in an orthogonal frequency division multiplexed (OFDM) waveform of cooperating frequency domain channels and a frame of time domain slots, providing a combination of frequency domain channels and time domain slots which define a broadcast channel;
    transmitting network clock information on the broadcast channel to remote units;
    receiving the broadcast channel at a remote unit; and
    deriving the network clock information from the received broadcast channel.

2. The method of claim 1 wherein:
    providing the broadcast channel includes providing a plurality of identified broadcast channel superframes;
    transmitting of the network clock information includes identifying a first broadcast channel superframe; and
    deriving network clock information includes the remote unit identifying the first broadcast channel superframe.

3. The method of claim 2 wherein:
    providing the broadcast channel includes each broadcast channel superframe having eight broadcast channel frames; and
    transmitting the first broadcast channel superframe identity includes transmitting the first broadcast channel superframe identity in a first plurality of broadcast channel frames.

4. The method of claim 3 wherein:
    providing the broadcast channel includes each broadcast channel frame having 32 network access channel frames; and
    transmitting the first broadcast channel superframe identity includes transmitting the first broadcast channel superframe identity in a first network access channel frame, in the first plurality of broadcast channel frames.

5. The method of claim 4 wherein:
    providing the broadcast channel includes each network access channel frame having 5 network access channel slots, and each network access channel slot includes 4 time slots; and
    transmitting the first broadcast channel superframe identity includes transmitting a first network access channel slot, in the first network access channel frame.

6. The method of claim 5 further comprising:
    maintaining a 29-bit superframe count to identify each broadcast channel superframe; and
    wherein:
    transmitting the first broadcast channel superframe identity includes transmitting a first 29-bit superframe count.

7. The method of claim 6 wherein:
    providing a broadcast channel includes a second broadcast channel superframe following the first broadcast channel superframe; and
    the method further comprising:
    following the first broadcast channel superframe, incrementing the first broadcast channel superframe count by one to create a second broadcast channel superframe count; and
    wherein:
    transmitting network clock information includes transmitting the second broadcast channel superframe count to identify the second broadcast channel superframe.

8. The method of claim 5 wherein:
    providing a broadcast channel includes using 32 reusable base station numbers, with the assignment of one network access channel frame, in each broadcast channel frame, to each base station number.

9. The method of claim 3 further comprising:
    loading the remote unit with a 32-bit hardware serial number;
    installing the remote unit in the network;
    transmitting the hardware serial number in a second plurality of broadcast channel frames;
    transmitting a 14-bit remote unit identity associated with the hardware serial number;
    receiving the hardware serial number at the remote unit;
    correlating the remote unit identity with the hardware serial number; and
    using the remote unit identity for communications with the remote unit.

10. In a wireless multiple access network, a method for initializing a remote unit, the method comprising:
- loading the remote unit with a 32-bit hardware serial number;
- installing the remote unit in the network;
- transmitting the hardware serial number and a corresponding 14-bit remote unit identity;
- at the remote unit, deriving the remote unit identity in response to receiving the hardware serial number; and
- using the remote unit identity for communications with the remote unit.

11. In a wireless multiple access network, a system for establishing a network time comprising:
- a first base station having a network clock and a port for communicating information organized in an orthogonal frequency division multiplexed (OFDM) waveform of cooperating frequency domain channels and a frame of time domain slots, including a combination of frequency domain channels and time domain slots which define a broadcast channel transmitting network clock information; and
- a first remote unit having a local clock and a port for communicating with the first base station, the first remote unit updating the local clock with the network clock information received on the broadcast channel.

12. The system of claim 11 in which the first base station transmits information in a plurality of broadcast channel superframes, and in which the first base station transmits network clock information which identifies a first broadcast channel superframe; and
- in which the first remote unit updates the local clock by identifying the first broadcast channel superframe.

13. The system of claim 12 in which each broadcast channel superframe includes eight broadcast channel frames, and in which the first base station transmits the first broadcast channel superframe identity in a first plurality of the broadcast channel frames.

14. The system of claim 13 in which each broadcast channel frame includes 32 network access frames, and in which the first base station transmits the first broadcast channel superframe identity in a first network access channel frame, in the first plurality of broadcast channel frames.

15. The system of claim 14 in which each network access channel frame includes 5 network access channel slots, and in which the first base station transmits the broadcast channel superframe identity in a first network access channel slot, in the first network access channel frame.

16. The system of claim 15 in which the first base station network clock includes a 29-bit superframe counter to identify each broadcast channel superframe, and in which the first base station transmission of the first broadcast channel superframe identity includes transmitting a first 29-bit superframe count.

17. The system of claim 16 in which a second broadcast channel superframe follows the first broadcast channel superframe, in which the superframe counter is incremented by one, following the first broadcast channel superframe, to create a second broadcast channel superframe count, and in which the second broadcast channel superframe count is transmitted to identify the second broadcast channel superframe.

18. The system of claim 15 further comprising:
- 32 base stations, including the first base station;
- in which each base station transmits broadcast channel information in one network access channel frame, within each broadcast channel frame.

19. The system of claim 13 in which the first remote unit further comprises a memory including a first 32-bit hardware serial number, when the first remote unit is installed in the network;
- in which the first base station transmits the first hardware serial number in a second plurality of the broadcast channel frames with a corresponding first 14-bit remote unit identity; and
- in which the first remote receives the first base station transmissions including the first hardware serial number, and derives the first remote unit identity from the received first base station transmission, the first remote unit using the first remote unit identity for subsequent communications with the first base station.

* * * * *